United States Patent
Bell et al.

(10) Patent No.: US 6,909,363 B2
(45) Date of Patent: Jun. 21, 2005

(54) CIRCUIT FOR ADAPTING A RECEPTACLE SOCKET IN A TOWING VEHICLE FOR DIVERSE TRAILER CIRCUITS

(75) Inventors: Joseph A. Bell, Markle, IN (US); Jay E. Bissontz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 32 days.

(21) Appl. No.: 10/644,213

(22) Filed: Aug. 20, 2003

(65) Prior Publication Data

US 2005/0040936 A1 Feb. 24, 2005

(51) Int. Cl.[7] .............................................. G08B 21/00
(52) U.S. Cl. ...................... 340/431; 340/468; 303/123
(58) Field of Search ................................ 340/431, 468, 340/477, 475, 479; 315/80, 77; 307/10.1; 303/123, 7

(56) References Cited

U.S. PATENT DOCUMENTS

| | | | | |
|---|---|---|---|---|
| 3,849,664 A | * | 11/1974 | Bryant | .......................... 315/77 |
| 3,970,860 A | * | 7/1976 | Purdy | .......................... 340/477 |
| 4,270,115 A | * | 5/1981 | Bonnett | ....................... 340/431 |
| 5,263,771 A | * | 11/1993 | Smith | .......................... 303/123 |
| 5,389,823 A | * | 2/1995 | Hopkins et al. | ........... 307/10.1 |
| 6,232,722 B1 | * | 5/2001 | Bryant et al. | .................. 315/80 |

OTHER PUBLICATIONS

Society of Automotive Engineers, Inc., SAE Surface Vehicle Standard J560, Jul. 1998, SAE International, Warrendale, PA, USA.

* cited by examiner

*Primary Examiner*—Daniel Wu
*Assistant Examiner*—Travis Hunnings
(74) *Attorney, Agent, or Firm*—Jeffrey P. Calfa; Dennis Kelly Sullivan; Susan L. Lukasik

(57) ABSTRACT

A circuit (26) for configuring a seven-terminal receptacle socket (10) in a towing vehicle to properly accommodate the particular one of several possible electric circuit configurations in a particular trailer that is being towed by the towing vehicle. The particular electric circuit configuration in the trailer—FIGS. 3, 4, 5, 6 are four possible configurations—depends on the particular lamps (52, 54, 56, 58, 72, 74) and brakes (50, 80) in the trailer.

14 Claims, 5 Drawing Sheets

CIRCUIT FOR ADAPTING A RECEPTACLE SOCKET IN A TOWING VEHICLE FOR DIVERSE TRAILER CIRCUITS

FIELD OF THE INVENTION

This invention relates generally to electrical systems of motor vehicles, especially motor vehicles that are capable of towing trailers and that have receptacle sockets with which trailer connector plugs are mated when the trailers are being towed. More particularly, the invention relates to a circuit for configuring such a receptacle socket to accommodate various trailers having diverse circuits depending upon the particular electrical equipment in a particular trailer.

BACKGROUND OF THE INVENTION

Certain motor vehicles, such as medium duty trucks for example, are capable of towing various types of non-fifth-wheel trailers. Such a towing vehicle has a trailer hitch at the rear, a pintle- or ball-type hitch for example, and such a trailer has a coupling at its front that releasably connects to the vehicle hitch.

Regardless of the particular trailer type or model, a trailer's electrical equipment will include various exterior lamps, including lamps capable of signaling a stop, a right turn, and a left turn. The right turn and left turn lamps are also used for hazard warning. Additional lamps that are typically present include: clearance, side marker, and identification lamps; and tail and license plate lamps. For placing such lamps under the control of the correct circuits in the towing vehicle, the trailer electrical system comprises a connector plug, typically forming a termination for one end of a multi-conductor cable, that mates with a receptacle socket in the towing vehicle.

Trailers that are equipped with certain types of brakes have circuits that require proper connection with circuits in the towing vehicles, and those connections occur through mated connector plugs and receptacle sockets.

A trailer that has electric trailer brakes requires electric current from an electric trailer brake controller in the towing vehicle. The electric trailer brake controller may be coupled with the vehicle service brake system to apply the trailer brakes in correlation with how hard the driver is applying the service brakes and/or have a separate actuator that allows the driver to apply the trailer brakes independently of application of the vehicle service brakes. The current to the trailer brakes passes through mated terminals in the plug and socket in an amount correlated with the how hard the driver is applying the service brakes in the vehicle, or optionally how hard the driver is applying the trailer brakes via the manual actuator of the trailer brake controller.

A trailer that has air-actuated trailer brakes requires air from the towing vehicle brake system in order to apply the trailer brakes. While that by itself does not involve any connection between the trailer electric system and the towing vehicle electric system, the presence of an ABS controller as part of the trailer air brake system does.

The industry has adopted certain standards for such receptacle sockets, and an example of one such standard is SAE (Society of Automotive Engineers) Standard J560. A receptacle socket compliant with that standard is sometimes referred to as a seven-pin, or seven-terminal, trailer socket, or connector. The standard specifies certain "pin-outs" for the seven individual terminals. Six terminals are arrayed in a circle at 60° intervals while the seventh is located at the center of the circle. Which circuits in the towing vehicle are connected to which terminals in the receptacle socket depends on the particular circuits in a particular trailer.

According to SAE Standard J560, the receptacle socket terminals are designated numerically in order, No. 1 through No. 7. Viewed axially in the direction looking at the open end of the receptacle socket, terminal No. 1 is at the 12:00 position, terminal No. 2 is at the 2:00 position, terminal No. 3 is at the 4:00 position, terminal No. 4 is at the 6:00 position, terminal No. 5 is at the 8:00 position, terminal No. 6 at the 10:00 position, and terminal 7 No. 7 is at the center.

The Standard specifies that: terminal No. 1 is a ground return from the trailer to the towing vehicle; terminal No. 2 is a feed for clearance, side marker, and identification lamps; terminal No. 3 is a feed for a left turn signal; terminal No. 4 is a feed for a stop signal; terminal No. 5 is a feed for a right turn signal; and terminal No. 6 is a feed for tail and license plate lamps. When a trailer is equipped with electric trailer brakes, terminal No. 7 is a feed for electric current that actuates the trailer brakes. When a trailer is equipped with air brakes, terminal No. 7 may not necessarily be used; however, when an ABS controller is associated with the trailer air brakes to endow them with ABS capability, terminal No. 7 provides a continuous D.C. power supply voltage for the ABS controller.

Hence, the Standard recognizes two distinct possibilities for trailer electric systems based on type of trailer brake system.

There are also two distinct possibilities for stop and turn signal lamp circuits in a trailer: 1) circuits that serve separate stop and turn signal lamps; and 2) circuits that serve combination stop and turn signal lamps.

A trailer that has separate stop and turn signal lamps has: 1) at least one right stop lamp, or lamp assembly; 2) at least one left stop lamp, or lamp assembly; 3) at least one right turn signal lamp, or lamp assembly; and 4) at least one left turn signal lamp, or lamp assembly.

A trailer that has combination stop and turn signal lamps has: 1) at least one right combination stop/turn signal lamp, or lamp assembly; and 2) at least one left stop/turn signal lamp, or lamp assembly.

These possibilities for different stop/turn signal lamps and different brakes lead to four possible circuit configurations for a trailer.

Configuration No. 1: Electric trailer brakes and combination stop and turn signal lamps.

Configuration No. 2: Electric trailer brakes and separate stop and turn signal lamps.

Configuration No. 3: Air trailer brakes and separate stop and turn signal lamps.

Configuration No. 4: Air trailer brakes and combination stop and turn signal lamps.

The receptacle socket in a towing vehicle is typically hard-wired for a particular one of these four configurations, enabling the vehicle to tow a trailer having that particular configuration. If a towing vehicle were to tow a vehicle having a different configuration, it has been the practice to provide an additional receptacle socket that is properly hard-wired for that different configuration. Hence, towing vehicles may have multiple receptacle sockets, each for properly connecting the particular electric system in a trailer to the towing vehicle electric system.

Certain passenger vehicles (many domestic-built) have combination stop and turn signal lamps while others (many non-domestic-built) have separate stop and turn signals.

Domestic laws and regulations typically mandate that stop lamps be red. Consequently, combination stop and turn signal lamps in a motor vehicle will illuminate red whenever the driver is applying the brakes. Should the driver give a turn signal while applying the brakes, the lamp toward the side of the turn will flash red, while the opposite lamp remains continuously on as long as the brakes continue to be applied. Should the driver give a turn signal while not applying the brakes, the lamp toward the side of the turn will flash red, while the opposite lamp remains off. Combination stop and turn signal lamps in a trailer can simply be connected in parallel with the combination stop and turn signal lamps in the towing vehicle via the mated connector plug and receptacle socket.

The operation of stop lamps in a motor vehicle having separate stop and turn separate stop lamps is obviously independent of operation of the turn signal lamps, and vice versa. Separate stop and turn signal lamps in a trailer towed by such a vehicle can simply be connected in parallel with the separate stop and turn signal lamps in the vehicle via the mated connector plug and receptacle socket so that their operation is essentially slaved to that of the stop and turn signal lamps in the vehicle.

The rear turn signal lamps in a vehicle that has separate stop and turn signal lamps may have a color other than red, amber being an example of such an alternate color. Amber turn signal lamps may also be used in trailers having separate stop and turn signal lamps. So long as the towing vehicle has separate stop and turn signal lamps, the particular color of the separate trailer turn signal lamps is unimportant. That is not the case however when the towing vehicle has combination stop and turn signal lamps.

Were a receptacle socket in a vehicle having combination stop and turn signal lamps to be used to feed the stop and turn signal lamps in a trailer having separate stop and turn signal lamps, the trailer turn signal lamps would illuminate concurrently with the stop lamps. But should the trailer turn signal lamps be amber, a color that by itself is permissible under certain government regulations for signaling a turn, the unintended happenstance of amber turn signal lamps also signaling a stop may be impermissible, and hence should be avoided.

Were a receptacle socket in a vehicle having separate stop and turn signal lamps to be used to feed the stop and turn signal lamps in a trailer having combination stop and turn signal lamps, the trailer stop lamps would not illuminate concurrently with the stop lamps in the vehicle. That would also be impermissible, and hence should be avoided.

SUMMARY OF THE INVENTION

The present invention relates to a circuit for configuring a receptacle socket in a towing vehicle to properly accommodate the particular one of several possible electric circuit configurations in the particular trailer that is being towed by the towing vehicle, the particular electric circuit configuration in the trailer depending on the particular electrical equipment in the trailer.

The present invention serves to accommodate each of the four numbered configurations identified above so that when a towing vehicle that has combination stop and turn signal lamps is used to tow a trailer whose electric system fits any one of the four configurations, the trailer electric system will properly relate to the towing vehicle electric system.

The invention avoids the need to provide a towing vehicle with multiple receptacle sockets, each hard-wired for a particular trailer circuit configuration. The invention comprises a switch-controlled circuit by which the driver of the towing vehicle selects a receptacle socket configuration appropriate to the particular stop/turn signal lamp configuration in the trailer to be towed.

Proper configuring of the center terminal in the seven-terminal receptacle socket for the particular type of trailer brakes is accomplished automatically. The default configuration is for a trailer having electric trailer brakes. When a trailer has air brakes, the tractor protection valve must be depressed to release the trailer parking brakes. That action operates a pressure switch, or sensor, in an air line in the vehicle that re-configures the center terminal for trailer air brakes.

The invention is believed to provide a better solution for accommodating various trailer electric systems without having a separate receptacle socket for each possible trailer circuit configuration. It avoids the possibility that a connector plug in a trailer will be plugged into an incorrect receptacle socket in a towing vehicle where all socket receptacles have the same geometry. The invention also aids in helping to avoid unintended accidental violations of applicable government regulations.

One general aspect of the invention relates to a towing vehicle for towing a trailer. The trailer has right and left stop and turn signal lamps, and those lamps may be either combination lamps or separate lamps. The towing vehicle has a combination right rear stop and turn signal lamp, a combination left rear stop and turn signal lamp, a separate right front turn signal lamp, and a separate left front turn signal lamp.

A right feed terminal in a receptacle socket in the towing vehicle feeds a right lamp of the trailer to signal a right turn. A left feed terminal feeds a left lamp of the trailer to signal a left turn. A selector in the towing vehicle selects either combination stop and turn signal lamps on the trailer or separate stop and turn signal lamps on the trailer.

The towing vehicle has a first circuit device operated by the selector to connect the combination right rear stop and turn signal lamp to the right feed terminal when the selector is selecting combination stop and turn signal lamps on the trailer and to connect the right front turn signal lamp to the right feed terminal when the selector is selecting separate stop and turn signal lamps on the trailer.

The towing vehicle also has a second circuit device operated by the selector to connect the combination left rear stop and turn signal lamp to the left feed terminal when the selector is selecting separate stop and turn signal lamps on the trailer and to connect the left front turn signal lamp to the left feed terminal when the selector is selecting separate stop and turn signal lamps on the trailer.

Another general aspect of the invention relates to a towing vehicle for towing a trailer having brakes that may be either electric brakes or ABS-controlled air brakes. The towing vehicle has a receptacle socket comprising a brake feed terminal for brakes in the trailer. A circuit device in the towing vehicle selectively connects the brake feed terminal to battery voltage in the towing vehicle when the trailer brakes are ABS-controlled air brakes and to an electric trailer brake controller in the towing vehicle when the trailer brakes are electric trailer brakes.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
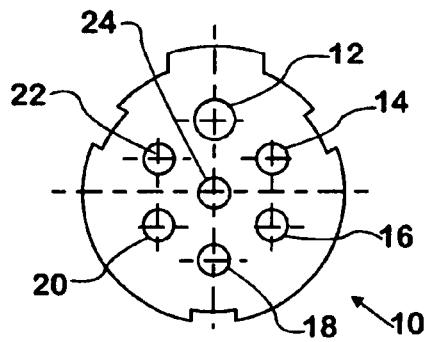
FIG. 1 is a view looking at the open end of a seven-terminal receptacle socket for receiving a mating trailer connector plug.

FIG. 1 shows a receptacle socket 10 compliant with SAE Standard J560 comprising six terminals 12, 14, 16, 18, 20, and 22 arrayed in a circle at 60° intervals and a seventh terminal 24 located at the center of the circle. The trailer connector plug that plugs into receptacle socket 10 is not shown.

According to SAE Standard J560, terminal 12 is a ground return from the trailer to the towing vehicle; terminal 14 is a feed for clearance, side marker, and identification lamps; terminal 16 is a feed for a left turn signal, terminal 18 is a feed for a stop signal; terminal 20 is a feed for a right turn signal, and terminal 22 is a feed for tail and license plate lamps.

When a trailer is equipped with electric trailer brakes, terminal 24 is a feed for electric current that actuates the trailer brakes. When a trailer is equipped with air brakes, terminal 24 may not necessarily be used; however, when an ABS controller is associated with the trailer air brakes to endow them with ABS capability, terminal 24 provides a continuous D.C. power supply voltage for the ABS controller.

Figure 2:
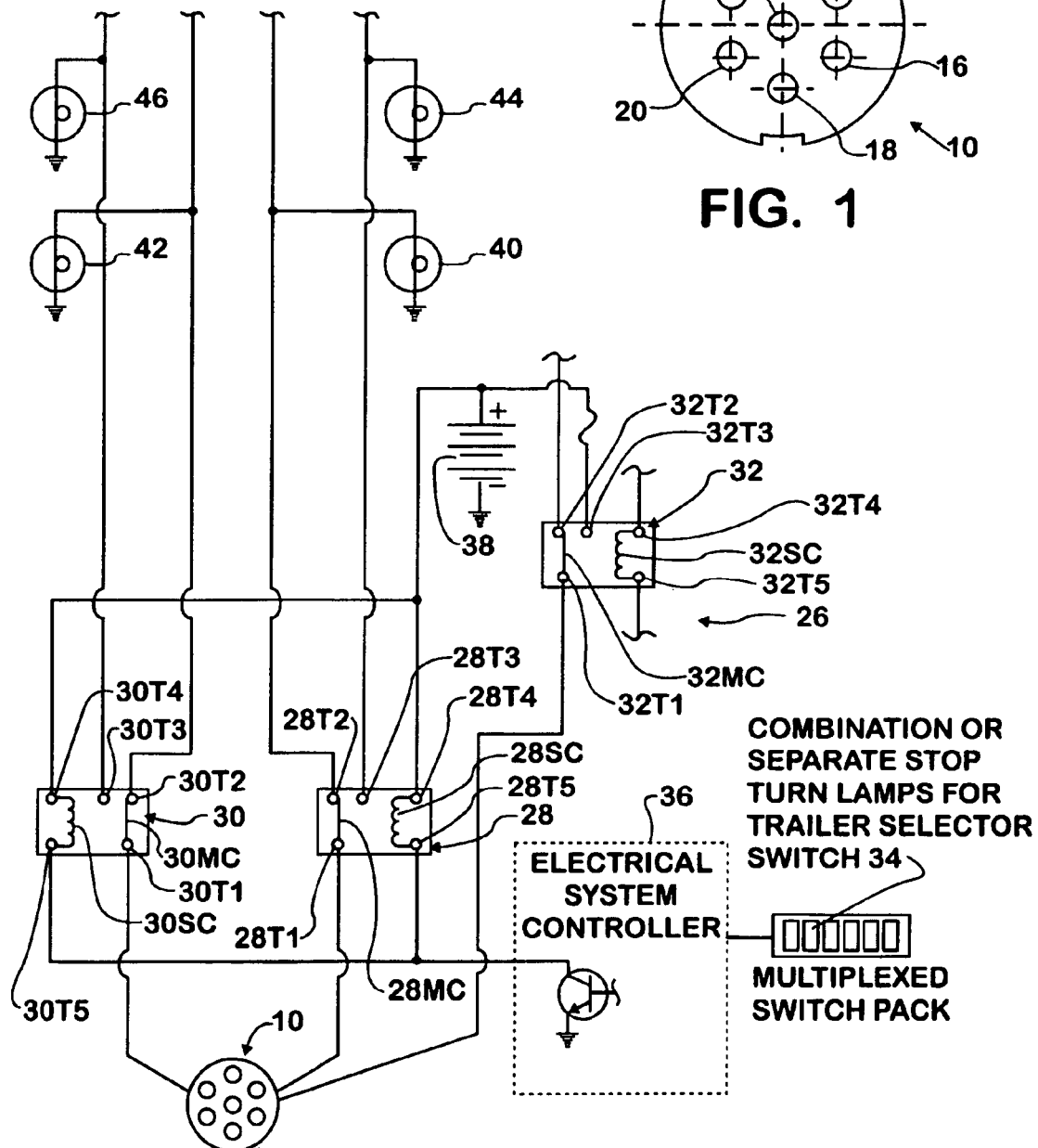
FIG. 2 is a schematic diagram of a circuit associated with the receptacle socket in a towing vehicle in accordance with principles of the invention.

FIG. 2 shows a presently preferred embodiment of inventive circuit 26 to comprise three relays 28, 30, 32 and a selector switch 34. Switch 34 is shown as one of several switches in a multiplexed switch pack. The other circuit device shown in FIG. 2 is an electric system controller 36 of the towing vehicle. The electric system of the towing vehicle comprises a negative ground D.C. power supply comprising a battery 38.

The towing vehicle has combination stop and turn signal lamps at the right and left rear of the vehicle. The right rear combination stop and turn signal lamp is marked by the reference numeral 40, and the left rear combination stop and turn signal lamp, by the reference numeral 42. At its right front the vehicle comprises a right turn signal lamp 44, and at its left front, a left turn signal lamp 46.

Stop and turn signal switches (not specifically shown) control lamps 40, 42, 44, and 46 in the following manner.

When no turn signal is given, application of the vehicle service brakes will cause lamps 40 and 42 to illuminate continuously as long as the service brakes continue to be applied. If the turn signal switch is operated to signal a turn while the service brakes are being applied, the lamp 40 or 42 to the side of the turn will begin to flash while the opposite lamp 40 or 42 continues to remain continuously on. The front turn signal lamp 44 or 46 to the side of the turn will also flash while the corresponding rear lamp is flashing, but the opposite front turn signal lamp will remain off.

If the turn signal switch is operated to signal a turn while the service brakes are not being applied, both the lamp 40 or 42 to the side of the turn and the corresponding front lamp 44 or 46 will begin to flash while the opposite rear lamp 40 or 42 and the opposite front lamp 44 or 46 remain off.

The presence of a hazard warning switch in the vehicle electric system will also operate lamps 40, 42, 44, 46 by causing all of them to flash when the hazard warning switch is switched on. The hazard warning function in effect overrides brake and turn signal functions.

Relay 28 comprises a solenoid coil 28SC and a movable contact 28MC that is operated by coil 28SC. When coil 28SC is not energized, contact 28MC completes a circuit between a terminal 28T1 and a terminal 28T2. When coil 28SC is energized, contact 28MC breaks the circuit from terminal 28T2 to make a circuit between a terminal 28T1 and a terminal 28T3.

Relay 30 comprises a solenoid coil 30SC and a movable contact 30MC that is operated by coil 30SC. When coil 30SC is not energized, contact 30MC completes a circuit between a terminal 30T1 and a terminal 30T2. When coil 30SC is energized, contact 30MC breaks the circuit from terminal 30T2 to make a circuit between a terminal 30T1 and a terminal 30T3.

Relay 32 comprises a solenoid coil 32SC and a movable contact 32MC that is operated by coil 32SC. When coil 32SC is not energized, contact 32MC completes a circuit between a terminal 32T1 and a terminal 32T2. When coil 32SC is energized, contact 32MC breaks the circuit from terminal 32T2 to make a circuit between a terminal 32T1 and a terminal 32T3.

Coil 28SC is connected between terminals 28T4 and 28T5 in relay 28. Terminal 28T4 is connected to the positive power supply voltage in the vehicle. Terminal 28T5 is connected to a terminal 36T1 of system controller 36.

Coil 30SC is connected between terminals 30T4 and 30T5 in relay 30. Terminal 30T4 is connected to the positive power supply voltage in the vehicle. Terminal 30T5 is connected to terminal 36T1. This places the two coils in parallel under the control of controller 36.

Controller 36 comprises another terminal 36T2 that is connected to switch 34. When switch 34 is operated to a first position, controller 36 assumes a state that does not energize coils 28SC, 30SC. When switch 34 is operated to a second position, controller 36 assumes a state that does energize coils 28SC, 30SC.

Coil 32SC is connected between terminals 32T4 and 32T5 in relay 32. Terminal 32T4 may or may not be connected to the vehicle ignition switch (not specifically shown). If the towing vehicle has air brakes, as will be seen in the configurations of FIGS. 5 and 6, terminal 32T4 will be connected to the ignition switch via wiring in the vehicle. Terminal 32T5 will also be connected through a pressure switch to ground. If the towing vehicle lacks air brakes, no switch 48 will be present and so terminal 32T5 is left unconnected. Terminal 32T4 may or may not be connected. A towing vehicle that lacks air brakes is unlikely to tow a trailer that does. A trailer that has electric brakes will be connected to an electric trailer brake controller in the towing vehicle via relay 32, as will be seen in the configurations of FIGS. 3 and 4.

Terminal 32T3 is connected to the positive power supply voltage, and when the towing vehicle lacks air brakes and is to tow a trailer that has electric trailer brakes, terminal 32T2 is connected to an electric trailer brake controller in the towing vehicle.

Terminal 32T1 is connected to terminal 24 in receptacle socket 10; terminal 28T1 to terminal 20; and terminal 30T1 to terminal 16.

Figure 3:
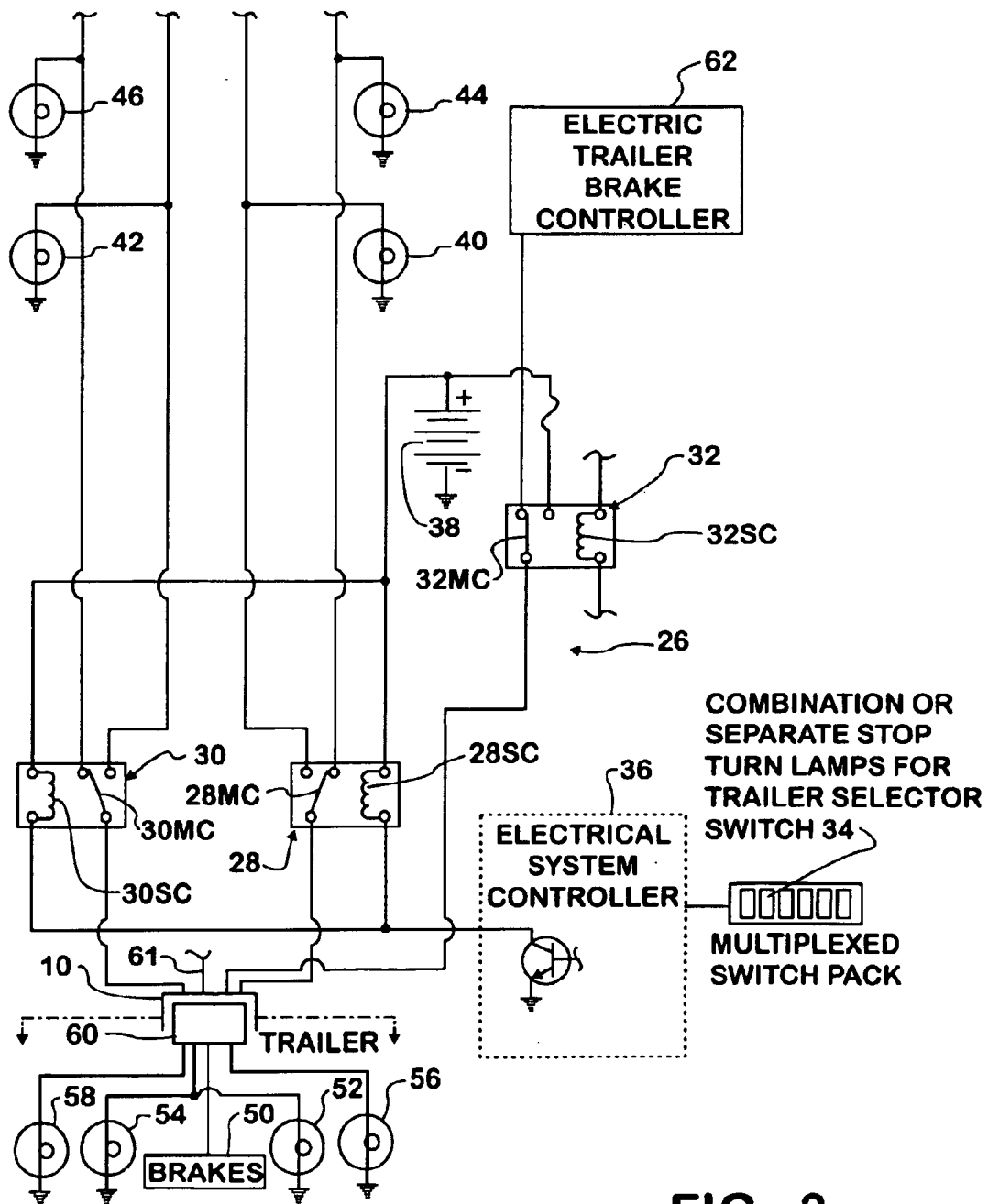
FIG. 3 is a schematic diagram showing the condition of the circuit of FIG. 2 with the electric system of a trailer having electric trailer brakes and separate stop and turn signal lamps connected to the towing vehicle by plugging a connector plug in the towing vehicle into the receptacle socket.

FIG. 3 shows the relevant portion of the electric system of a trailer having electric trailer brakes 50 and separate stop and turn signal lamps on right and left sides, lamp 52 being the right stop lamp, lamp 54 being the left stop lamp, lamp 56 being the right turn signal lamp, lamp 58 being the left turn signal lamp. The trailer comprises a connector plug 60 at an end of a multi-conductor cable having conductors connected with brakes 50 and lamps 52, 54, 56, 58, as shown.

Because stop lamps 52, 54 are separate from turn signal lamps 56, 58, the stop lamps are connected to a terminal in plug 60 that mates with terminal 18 in receptacle socket 10. The stop lamp feed to terminal 18 in the towing vehicle is identified by the numeral 61. Stop lamps 52, 54 will thereby illuminate concurrently with vehicle stop lamps 40, 42 when the driver of the towing vehicle applies the vehicle service brakes. Turn signal lamps 56, 58 are connected via respective conductors to respective terminals in plug 60 that mate with respective terminals 20, 16 in receptacle socket 10.

FIG. 3 also shows the condition of circuit 26 for this trailer configuration. Because the trailer has separate stop and turn signal lamps, selector switch 34 has been placed in its second position, causing coils 28SC, 30SC to be energized. That causes the respective feeds for trailer turn signal lamps 56, 58 to come from the front turn signal lamps 44, 46 respectively in the towing vehicle. Because the operation of turn signal lamps 44, 46 is unaffected by application of the vehicle service brakes, actuation of the brakes does not affect lamps 56, 58. Hence, lamps 56, 58 can be any color compliant with applicable regulations.

FIG. 3 also shows an electric trailer brake controller 62 in the towing vehicle. With the towing vehicle lacking air brakes, coil 32SC is not energized, and consequently the output of controller 62 is fed through to electric trailer brakes 50 via terminal 24 in receptacle socket 10 and a terminal in plug 60 mating with terminal 24.

Figure 4:
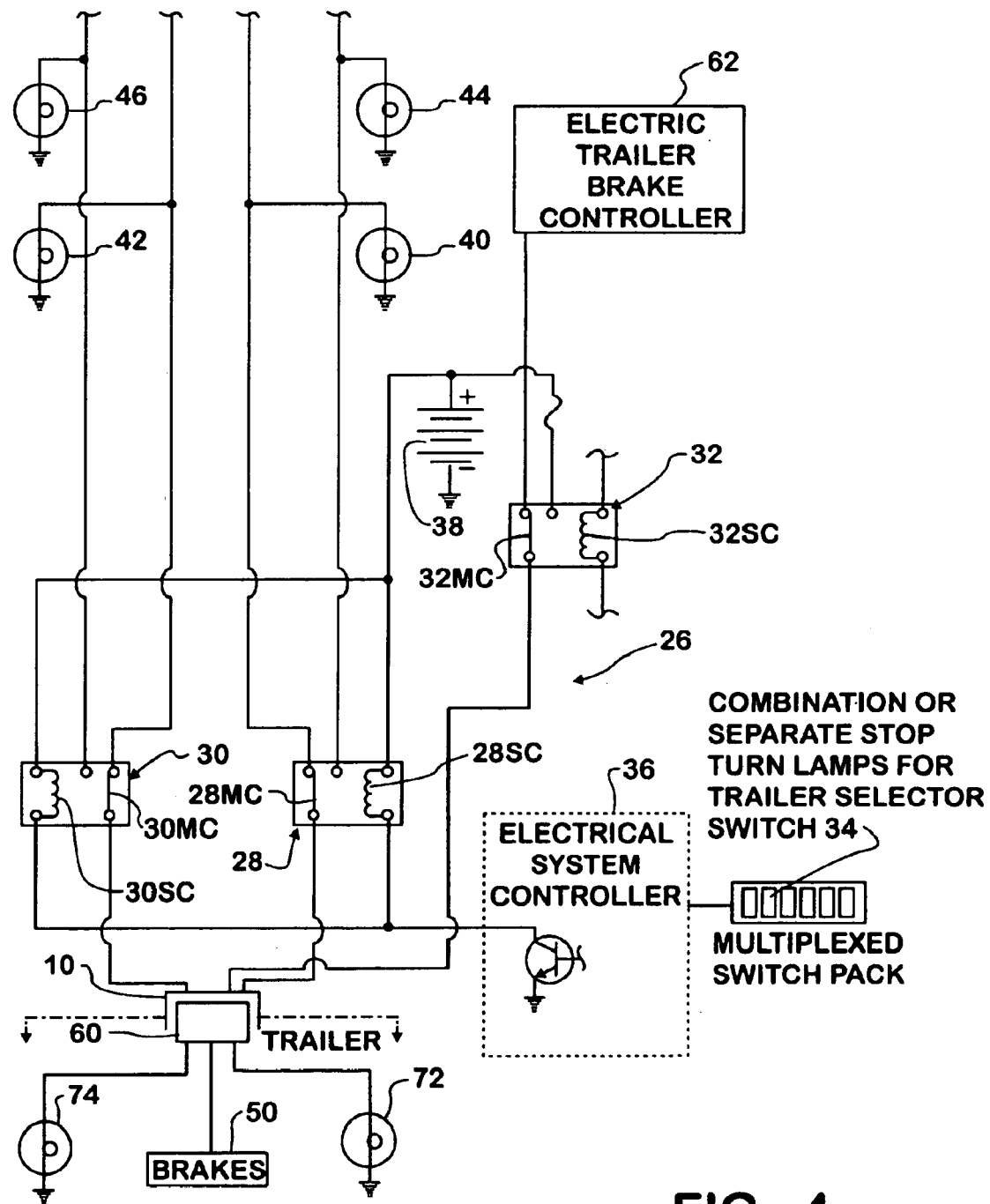
FIG. 4 is a schematic diagram showing the condition of the circuit of FIG. 2 with the electric system of a trailer having electric trailer brakes and combination stop and turn signal lamps connected to the towing vehicle by plugging a connector plug in the towing vehicle into the receptacle socket.

FIG. 4 shows the relevant portion of the electric system of a trailer having electric trailer brakes 50 and combination stop and turn signal lamps 72, 74 on right and left sides respectively. The trailer comprises a connector plug 60 at an end of a multi-conductor cable having conductors connected with brakes 50 and lamps 72, 74 as shown.

Lamp 72 is connected to a terminal in plug 60 that mates with terminal 20 in receptacle socket 10. Lamp 74 is connected to a terminal in plug 60 that mates with terminal 16 in receptacle socket 10.

FIG. 4 also shows the condition of circuit 26 for this trailer configuration. Selector switch 34 has been placed in its first position, causing coils 28SC, 30SC not to be energized. That causes the respective feeds for receptacle socket terminals 20 and 16 to come from the rear vehicle lamps 40, 42 respectively, slaving lamp 72 to lamp 40 and lamp 74 to lamp 42. Trailer lamps 72, 74 will therefore operate in the exact same manner as the combination rear stop and turn signal lamps in the vehicle, rendering the trailer lamps compliant with applicable regulations. When no separate stop lamp or lamps is or are present in the trailer, the trailer electric system has no need for the stop lamp feed provided by terminal 18.

FIG. 4 also shows an electric trailer brake controller 62 in the towing vehicle. With the towing vehicle lacking air brakes, coil 32SC is not energized, and consequently the output of controller 62 is fed through to electric trailer brakes 50 via terminal 24 in receptacle socket 10 and a terminal in plug 60 mating with terminal 24.

Figure 5:
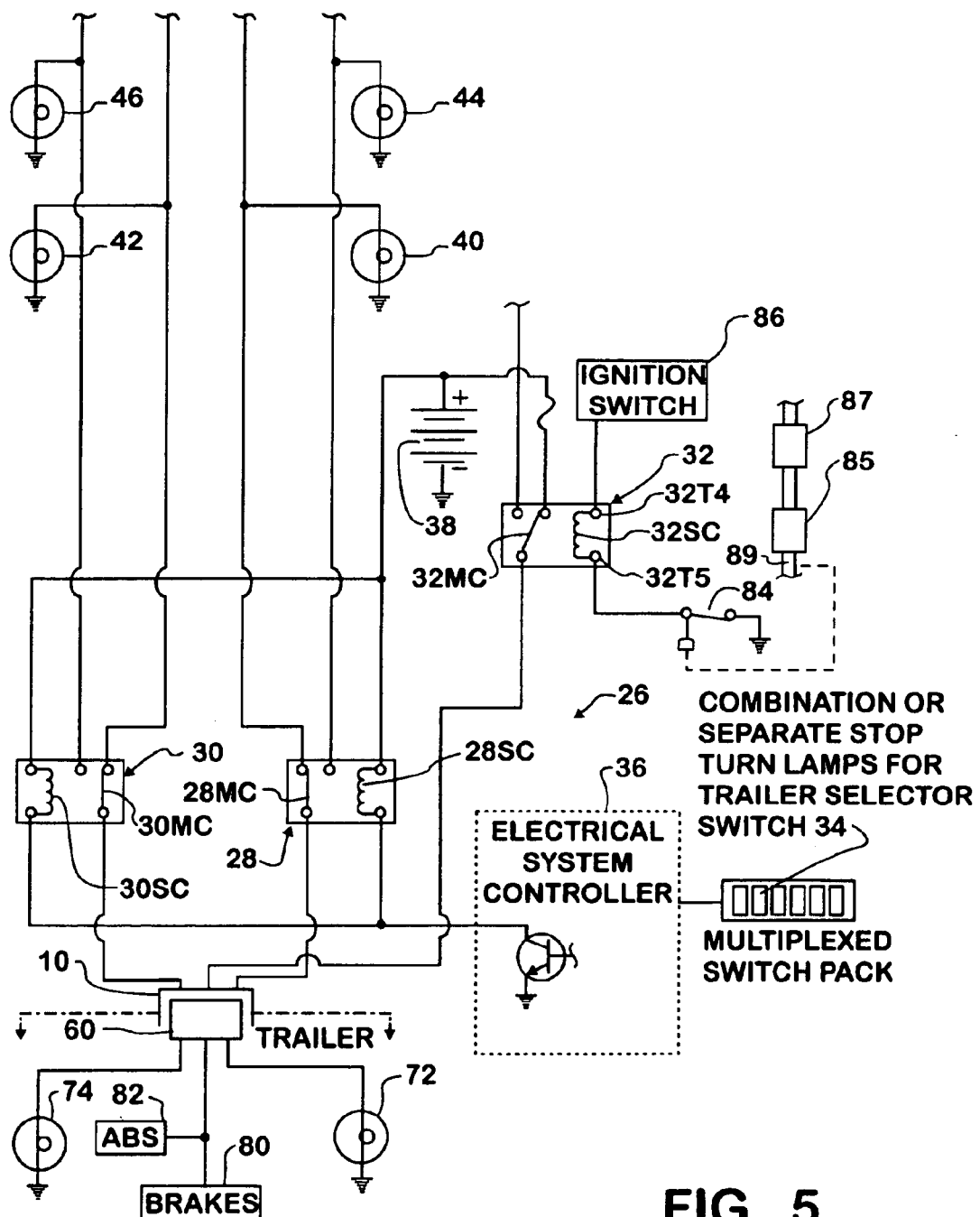
FIG. 5 is a schematic diagram showing the condition of the circuit of FIG. 2 with the electric system of a trailer having air brakes and combination stop and turn signal lamps connected to the towing vehicle by plugging a connector plug in the towing vehicle into the receptacle socket.

FIG. 5 shows the relevant portion of the electric system of a trailer having air brakes 80 and combination stop and turn signal lamps 72, 74 on right and left sides respectively. The trailer comprises a connector plug 60 at an end of a multi-conductor cable having conductors connected with lamps 72, 74 as shown. FIG. 5 shows the trailer having an ABS controller 82 associated with air brakes 80. Another conductor of the multi-conductor cable connects ABS controller 82 to a terminal in plug 60 that mates with terminal 24.

Because a trailer having air brakes is unlikely to be towed by a towing vehicle lacking air brakes, it is understood that the towing vehicle in FIG. 5 does have air brakes and that the air line or lines are properly connected between the towing vehicle and the trailer. The air brake system in the towing vehicle comprises a tractor protection valve 85 and a trailer charge valve 87 arranged as shown in the relevant portion of the air brake included in FIG. 5. Charge valve 87 is depressed when a trailer having air brakes is coupled to the towing vehicle and serves to supply air to tractor protection valve 85, which then applies air pressure to a line 89 leading to the trailer brakes to release the trailer brakes. The pressure in line 89 is sensed by a pressure switch 84 in the towing vehicle. Switch 84 is connected between terminal 32T5 and ground. Terminal 32T4 is connected to the ignition switch 86 in the towing vehicle.

Consequently, when ignition switch 86 is turned on and the trailer charge valve 87 is depressed, coil 32SC is energized, causing positive battery voltage to be delivered to terminal 24, thereby supplying battery voltage for ABS controller 82. Line 89 is not pressurized when a non-air brake trailer is coupled to the towing vehicle. It is also not pressurized when no trailer is coupled to the towing vehicle.

Because FIG. 5 shows the same circuit configuration for the combination stop and turn signal lamps as in FIG. 4, a description of the operation of those lamps need not be repeated.

Figure 6:
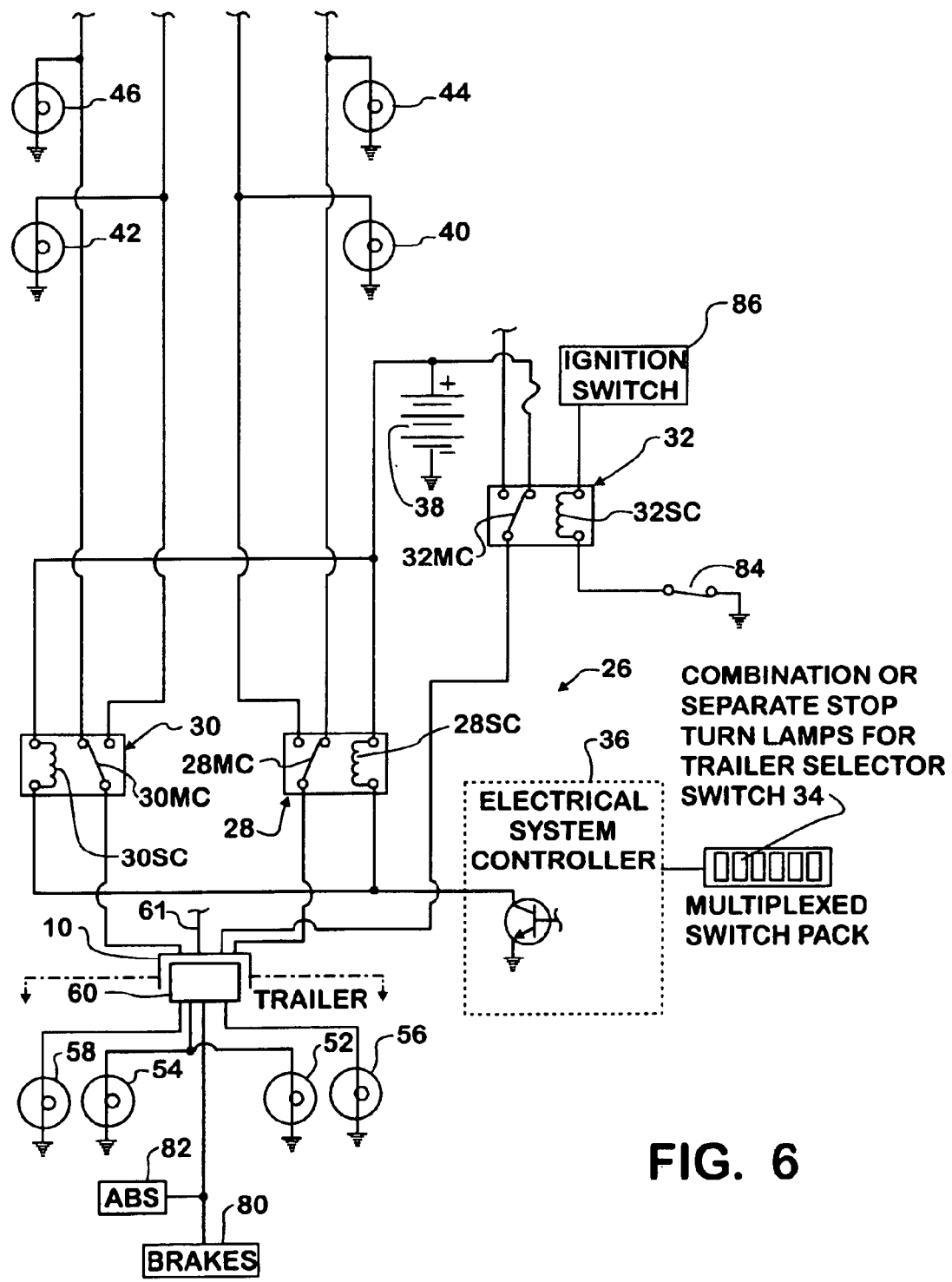
FIG. 6 is a schematic diagram showing the condition of the circuit of FIG. 2 with the electric system of a trailer having air brakes and separate stop and turn signal lamps connected to the towing vehicle by plugging a connector plug in the towing vehicle into the receptacle socket.

FIG. 6 shows the relevant portion of the electric system of a trailer having air brakes 80 and separate stop and turn signal lamps 52, 54, 56, 58. The operation of the respective lamp and brake circuits shown in FIG. 6 can be understood from previous descriptions of FIGS. 3 and 5, and so no description will be given here in the interest of brevity.

For any of the four described trailer configurations, all that a driver of the towing vehicle need do is operate switch 34 to select the proper lamp configuration in the trailer to be towed. If the trailer has air brakes, the proper circuit for them will be achieved automatically when the driver turns on the ignition switch, and the tractor protection valve is depressed.

While a presently preferred embodiment of the invention has been illustrated and described, it should be appreciated that principles of the invention are applicable to all embodiments that fall within the scope of the following claims.

What is claimed is:

1. For towing a trailer having right and left stop and turn signal lamps that may be either combination lamps or separate lamps, a towing vehicle comprising:
   a combination right rear stop and turn signal lamp;
   a combination left rear stop and turn signal lamp;
   a separate right front turn signal lamp;
   a separate left front turn signal lamp;
   a right feed terminal for feeding a right lamp of a trailer to signal a right turn;
   a left feed terminal for feeding a left lamp of a trailer to signal a left turn;
   a selector for selecting either combination stop and turn signal lamps on the trailer or separate stop and turn signal lamps on the trailer;
   a first circuit device operated by the selector to connect the combination right rear stop and turn signal lamp to the right feed terminal when the selector is selecting combination stop and turn signal lamps on the trailer and to connect the right front turn signal lamp to the right feed terminal when the selector is selecting separate stop and turn signal lamps on the trailer; and
   a second circuit device operated by the selector to connect the combination left rear stop and turn signal lamp to the left feed terminal when the selector is selecting combination stop and turn signal lamps on the trailer and to connect the left front turn signal lamp to the left feed terminal when the selector is selecting separate stop and turn signal lamps on the trailer.

2. A towing vehicle as set forth in claim 1 in which the first circuit device comprises a movable contact of a first relay and the second circuit device comprises a movable contact of a second relay.

3. A towing vehicle as set forth in claim 2 in which the first and second relays each comprise a respective solenoid coil that is not energized when the selector is selecting combination stop and turn signal lamps on the trailer and that is energized when the selector is selecting separate stop and turn signal lamps on the trailer.

4. A towing vehicle as set forth in claim 3 in which the selector comprises a selector switch that is effective via an electrical system controller in the vehicle to operate the relays.

5. A towing vehicle as set forth in claim 1 in which the towing vehicle further comprises a brake feed terminal for brakes in the trailer, and a circuit device for selectively connecting and disconnecting the brake feed terminal to and from battery voltage in the towing vehicle.

6. A towing vehicle as set forth in claim 5 in which the circuit device comprises a movable contact of a relay having a solenoid coil that, when energized, connects the brake feed terminal to battery voltage, and when not energized, disconnects the brake feed terminal from battery voltage.

7. A towing vehicle as set forth in claim 6 in which the towing vehicle comprises an electric trailer brake controller providing a variable voltage for controlling the intensity of application of electric brakes in the trailer, and when the solenoid coil of the relay is not energized, the movable contact of the relay connects the variable voltage of the electric trailer brake controller to the brake feed terminal.

8. A towing vehicle as set forth in claim 6 in which the towing vehicle comprises air service brakes, a tractor protection valve that requires actuation for releasing air brakes of a trailer coupled to the towing vehicle, and a pressure sensing device for sensing air pressure in an air line due to actuation of the tractor protection valve, and in which the pressure sensing device is effective to cause the solenoid coil of the relay to be energized, and hence the movable contact of the relay to connect battery voltage to the brake feed terminal, when sensing pressure in the air line due to actuation of the tractor protection valve.

9. A towing vehicle as set forth in claim 6 in which the towing vehicle comprises a seven-terminal receptacle socket for receiving a connector plug of the trailer, and in which the right feed terminal, the left feed terminal, and the battery feed terminal are disposed in the receptacle socket.

10. For towing a trailer having brakes that may be either electric brakes or ABS-controlled air brakes, a towing vehicle comprising:
    a brake feed terminal for brakes in the trailer, and a circuit device for selectively connecting the brake feed terminal to battery voltage in the towing vehicle when the trailer brakes are ABS-controlled air brakes and to an electric trailer brake controller in the towing vehicle when the trailer brakes are electric trailer brakes.

11. A towing vehicle as set forth in claim 10 in which the circuit device comprises a movable contact of a relay having a solenoid coil that, when energized, connects the brake feed terminal to battery voltage.

12. A towing vehicle as set forth in claim 11 in which the towing vehicle comprises air service brakes, a tractor protection valve that requires actuation for releasing air brakes of a trailer coupled to the towing vehicle, and a pressure sensing device for sensing air pressure in an air line due to actuation of the tractor protection valve, and in which the pressure sensing device is effective to cause the solenoid coil of the relay to be energized, and hence the movable contact of the relay to connect battery voltage to the brake feed terminal, when sensing pressure in the air line due to actuation of the tractor protection valve.

13. A towing vehicle as set forth in claim 10 in which towing vehicle comprises a seven-terminal receptacle socket for receiving a connector plug of the trailer, one of the seven terminals being the battery feed terminal.

14. A towing vehicle as set forth in claim 13 in which the towing vehicle comprises stop and turn signal lamps for signaling a stop, a right turn, and a left turn, a second terminal in the receptacle socket is a right turn signal feed terminal, a third terminal in the receptacle socket is a left turn signal feed terminal, and a fourth terminal in the receptacle socket is a stop signal feed terminal.

* * * * *